United States Patent

Grasvoll

[15] 3,648,857
[45] Mar. 14, 1972

[54] MACHINE FOR LOADING OBJECTS IN GROUPS ONTO PALLETS OR THE LIKE

[72] Inventor: Halvor Grasvoll, Goteborg, Sweden

[73] Assignees: Gustav G. Magnusson, Vastra Frolunda; Karl I. Weiner, Goteborg, Sweden, part interest to each

[22] Filed: May 4, 1970

[21] Appl. No.: 34,056

[30] Foreign Application Priority Data

May 19, 1969 Sweden...................................6587/69

[52] U.S. Cl. ...........................................................214/6 G
[51] Int. Cl. .....................................B65g 57/12, B65g 57/24
[58] Field of Search....................214/6 G, 6 DK, 6 P, 6 H, 6 A

[56] References Cited

UNITED STATES PATENTS

| | | | |
|---|---|---|---|
| 3,343,689 | 9/1967 | Fehely | 214/6 DK |
| 3,520,422 | 7/1970 | Bruce et al. | 214/6 P |
| 3,247,981 | 4/1966 | Johnson | 214/6 P |
| 3,437,215 | 4/1969 | Lunden | 214/6 DK |
| 3,130,839 | 4/1964 | Grasvoll | 214/6 DK |
| 3,294,257 | 12/1966 | Davies et al. | 214/6 P |
| 2,768,756 | 10/1956 | Horman | 214/6 P |
| 3,393,812 | 7/1968 | Mayo et al. | 214/6 DK |
| 3,531,001 | 9/1970 | Lunden | 214/6 DK |

FOREIGN PATENTS OR APPLICATIONS

| | | | |
|---|---|---|---|
| 194,745 | 2/1965 | Sweden | 214/6 DK |
| 1,144,648 | 2/1963 | Germany | 214/6 DK |

Primary Examiner—Gerald M. Forlenza
Assistant Examiner—Robert J. Spar
Attorney—Kane, Dalsimer, Kane and Kurucz

[57] ABSTRACT

The machine is intended to transfer uniform objects, such as for instance milk cartons, which are arranged in groups, from a feeding conveyor via a sloping feeder belt onto rollers. Means are provided to transfer the objects from the rollers onto a vertically and horizontally displaceable loading plate. A hinged means, normally being in an inoperative, swung-down position, is provided at the discharge end of the rollers so as to be influenced by the movement of said plate into assuming a horizontal position, wherein said means serves as a stripper for depositing the objects carried by the loading plate on the pallet.

5 Claims, 6 Drawing Figures

3,648,857

MACHINE FOR LOADING OBJECTS IN GROUPS ONTO PALLETS OR THE LIKE

BACKGROUND OF THE INVENTION

The present invention relates to a machine for loading objects in groups onto pallets or the like in superposed layers. The machine comprises a conveyor for feeding the objects, a row of rotatably driven rollers disposed in parallel and adapted to receive the objects, a device for transferring the objects onto a loading plate which is displaceable inwards and outwards in a horizontal direction, and a device for supplying pallets, one at a time, to a position in which the pallet is ready to receive the objects supported on the loading plate, when the latter returns to its retracted position, the machine in addition comprising a number of carrier means projecting up through gaps formed between the driven rollers. The machine is primarily intended for handling uniform milk cartons which are placed on a tray to be deposited in layers on pallets.

SUMMARY OF THE INVENTION

The invention is characterized that the carrier means extend upwards from the loading plate and that a stripper edge is provided in a position wherein it extends across the discharge end of said rollers, below which edge the loading plate is adapted to be displaced. A machine of this kind has a considerable capacity.

According to a preferred embodiment the machine comprises a device arranged to turn some groups of objects through 90° horizontally while other groups of objects remain un-turned. This makes it possible to stack the objects, in layers, one on top of the other, such that the groups of objects in superimposed layers will bind each other crosswise. The risk that the stack of objects supported on the pallet will fall, is thus eliminated even when this stack is a rather tall one.

DESCRIPTION OF A PREFERRED EMBODIMENT

The loading machine shown in the drawings is intended for loading milk cartons 1 in groups of 12 cartons in two adjacent rows on a rectangular tray 2, one side of which is double the length of the other side, whereby two such elongate trays may be deposited next to each other on each pallet 3 which is of square shape. The following two trays handled by the the machine are to be placed next to each other on the pallet on top of the first two trays 2 carrying objects 1 already placed on the pallet 3. However, before being so deposited, this second pair of trays are to be turned in the horizontal plane through 90°. The two following trays 2, with objects 1 supported thereon, are to be placed on top of the two trays turned through 90°, without, however, being turned, i.e., they will take the same position as the trays first deposited on the pallet.

Figure 1:
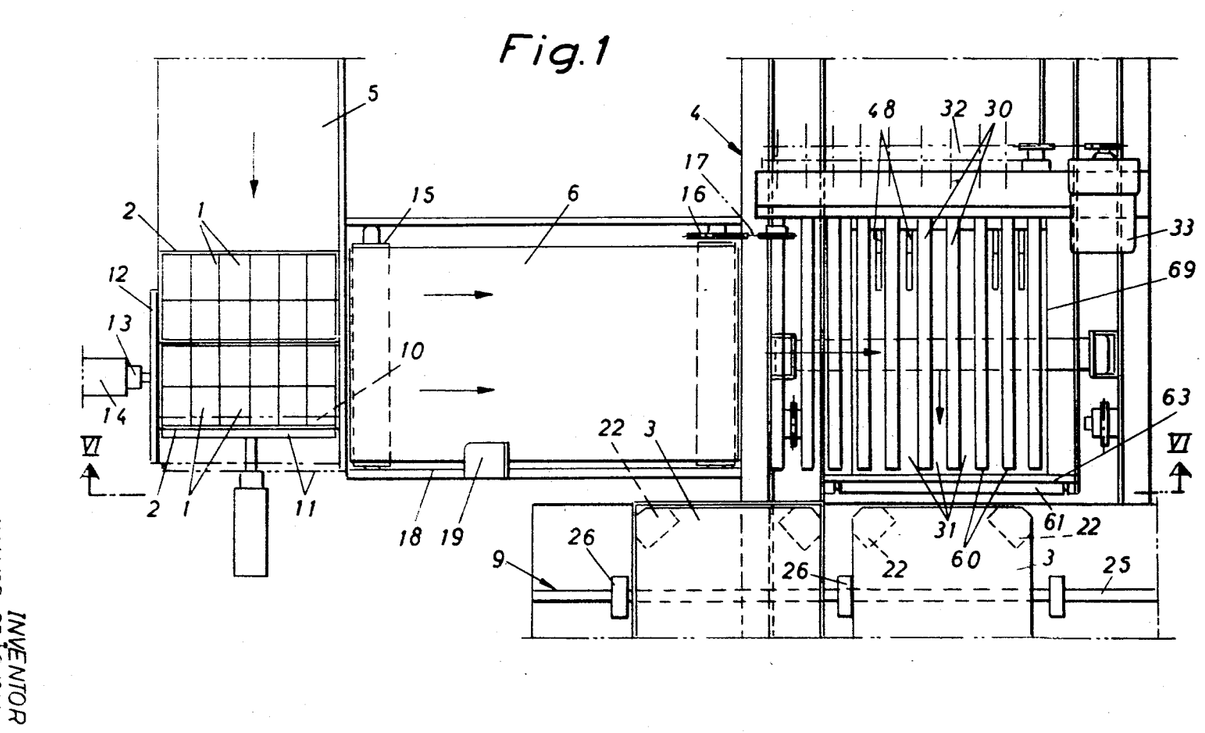
FIG. 1 is a plan view of the loading machine in accordance with the invention.
Figure 6:
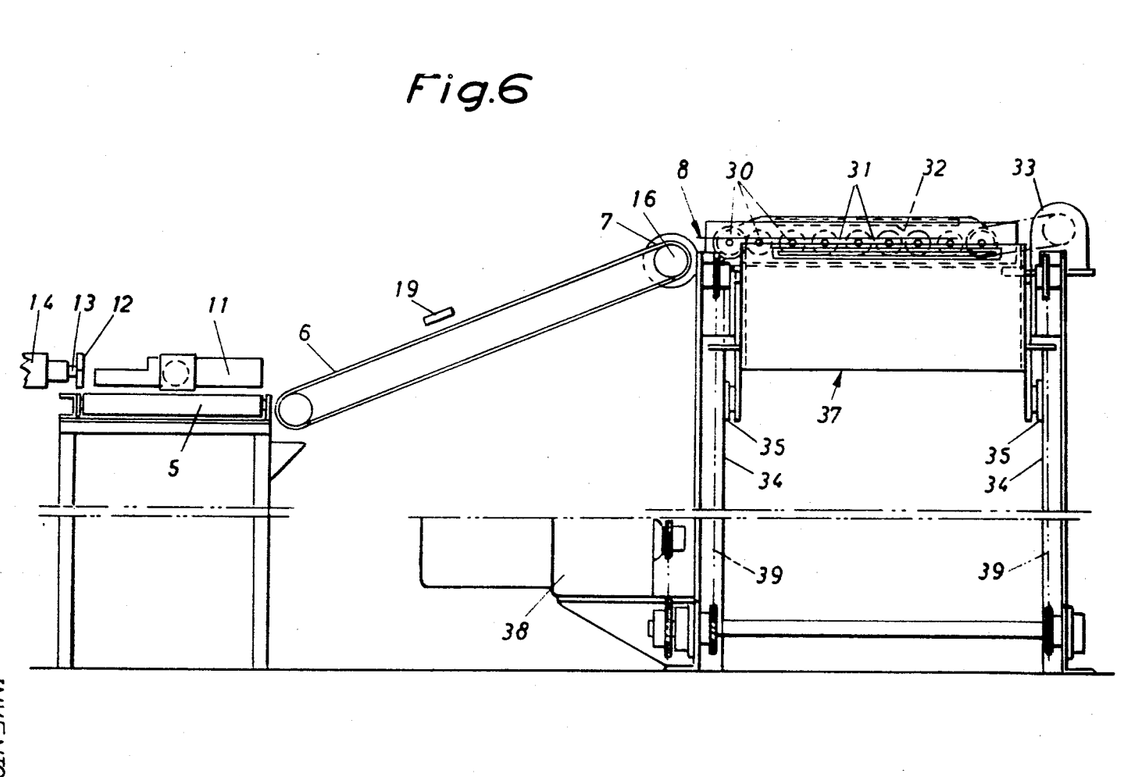
FIG. 6 is a vertical section of the machine shown partly in front view along line VI—VI of FIG. 1.

The loading machine 4 proper (see FIG. 1) comprises a conveyor 5 for advancing the trays 2 having milk cartons 1 supported thereon, from a packaging machine (not shown). The lower end of a sloping belt conveyor 6 extends at right angles from the advancing conveyor 5. The upper end 7 of the feeder belt conveyor 6 is at the same level as the upper loading-receiving plane 8 of the loading machine 4 proper (see FIG. 6). A device 9 for supplying pallets 3, one at a time, to the loading point and for feeding-out or removing, from the loading point, the pallets when fully loaded is provided, extending in parallel with the longitudinal direction of the feeding conveyor 6 (FIG. 1).

THE ADVANCING CONVEYOR

A stopper means 11 is arranged above the discharge end 10 of the advancing conveyor 5. Said stopper means 11 is arranged for movement in the longitudinal direction of the conveyor and may be adjusted in two operative position, on of which is shown in continuous lines and the other one in dash-and-dot lines in FIG. 1. A pusher means 12 is provided at that side of the advancing conveyor 5 which is remote from the feeding conveyor 6, the said pusher being displaced towards the feeding conveyor 6 upon actuation of a pneumatically operated piston and cylinder unit 13, 14. The pusher 12 makes it possible to transfer the trays 2 supporting the milk cartons 1 onto the feeding conveyor 6.

THE FEEDING CONVEYOR

The endless belt of the feeding conveyor 6 runs over two rollers 15 and 16, one of which, roller 16, is driven by means of a chain 17. Above the feeding conveyor 6 and extending inwards across one edge 18 thereof, i.e., the edge situated close to the stopper means 11, a stop lug 19 is arranged. The stop lug does not extend as far across the feeding conveyor 6 as the stopper 11 in the position wherein said stopper is farthest displaced across the advancing conveyor 5.

THE PALLET DISPLACEMENT MECHANISM

A glide path 21 is arranged on a low and elongate frame 20, the said glide path 21 being intended to support square-shaped pallets 3 having four feet 22. A continuous feeder chain 25 which is driven by an electric motor 24 extends in the longitudinal direction of the glide path 21 and is provided with equidistantly spaced follower means 26. The motor 24 is provided with a gear drive and a brake in order to stop the pallets, one by one, in the position of loading.

THE LOADING MACHINE PROPER

An angular bracket 28 is arranged at the top of the frame 27 of the loading machine 4 and a number of feeder rollers 30 are mounted in said bracket in horizontal bearings 29 with gaps 31 formed between said rollers. The rollers 30 are arranged in parallel with the upper roller 16 of the feeder conveyor 6 and are driven by an endless chain 32 from an electric motor 33.

The frame 27 is provided with two vertical guide rails 34 in the form of profile irons having a U-shaped cross section. Guide rollers 35, 36 are arranged so as to run in said guide rails 34. The guide rollers are mounted on an elevator cage 37 which is arranged in the frame 27 for vertical step by step movement, such displacement of the cage being carried out by a continuous chain 39 which is driven from an electric motor 38 and runs over pulleys 40 and 41 mounted in the frame 27. Attachment means 42, 43 are provided to secure the chain 39 to the elevator cage 37. The latter is provided with a horizontally displaceable loading plate 44 the front portions 45 of which extends closely beneath the feeder rollers 30 and the rear portion 46 of which extends at a lower level so as to create a sufficient space 47 to accommodate the angular bracket 28 supporting the bearings 29 for the rollers 30. The loading plate 44 is provided with carrier means 48 upstanding from the rear end of the front portion 45 of the plate 44 such that they project up through the gaps 31 separating the rollers 30. The front end of the loading plate 44 is supported by a carrying roll 49 which is rotatably mounted in the elevator cage 37 and the rear portion 46 of the loading plate is provided with support wheels 50 running in horizontal supporting paths 51 in the elevator cage 37. The loading plate 44 is, by means of an attachment means 52, secured to an endless chain 53 running over two pulleys 54, 55 on shafts 56 and 57, respectively, which are rotatably mounted in the elevator cage 37 and driven by a chain and a brake. A stripper edge 61 extends across the discharge end 60 of the feeder rollers 30, the said stripper edge being hingedly connected to a support edge 63 at the top of the cage 37 by means of a hinge joint 62. The weight of the stripper edge 61 keeps the latter folded-down (vertical) such that it takes a position in front of the forward end of the loading plate 44 across the path of movement of said plate, whereby the loading plate 44, when being moved out of the elevator cage 37, swings the striper edge 61 upwards into a horizontal position.

The machine also comprises means not shown on the drawings for automatically starting and stopping the electric motors 24, 38 and 59 and also for reversing the motors 38 and 59. The machine also includes means for displacing the elevator cage 37 stepwise with varying length of displacement of the cage as the loading of the pallet 3 progresses.

The rear end of the rear portion 46 of the loading plate 44 is provided with an opening 64 leaving a space at the vertical displacement of the elevator cage 37, for an operating arm 65 on a vertical shaft 66. The latter is connected with means (not shown) for starting the electric motor 24 in order to supply pallets 3. A tongue 67 on the loading plate portion 46 engages in the opening 64 and extends towards the shaft 66 externally of the arm 65. In the upper position of the loading plate 44 (FIG. 2) plate portion 46 is situated above the upper end 68 of the arm 65.

OPERATION OF THE LOADING MACHINE

Figure 2:
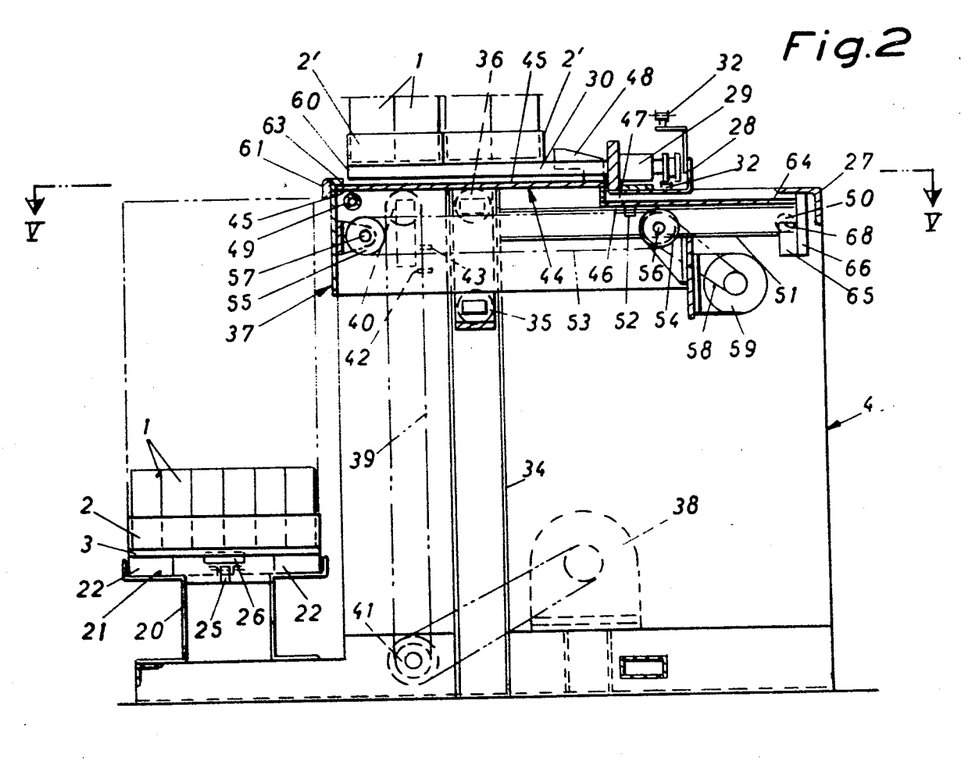
FIG. 2 is a vertical section through the machine along line II—II in FIG. 1, the loading plate being shown in its rear, retracted position (starting position)
Figure 3:
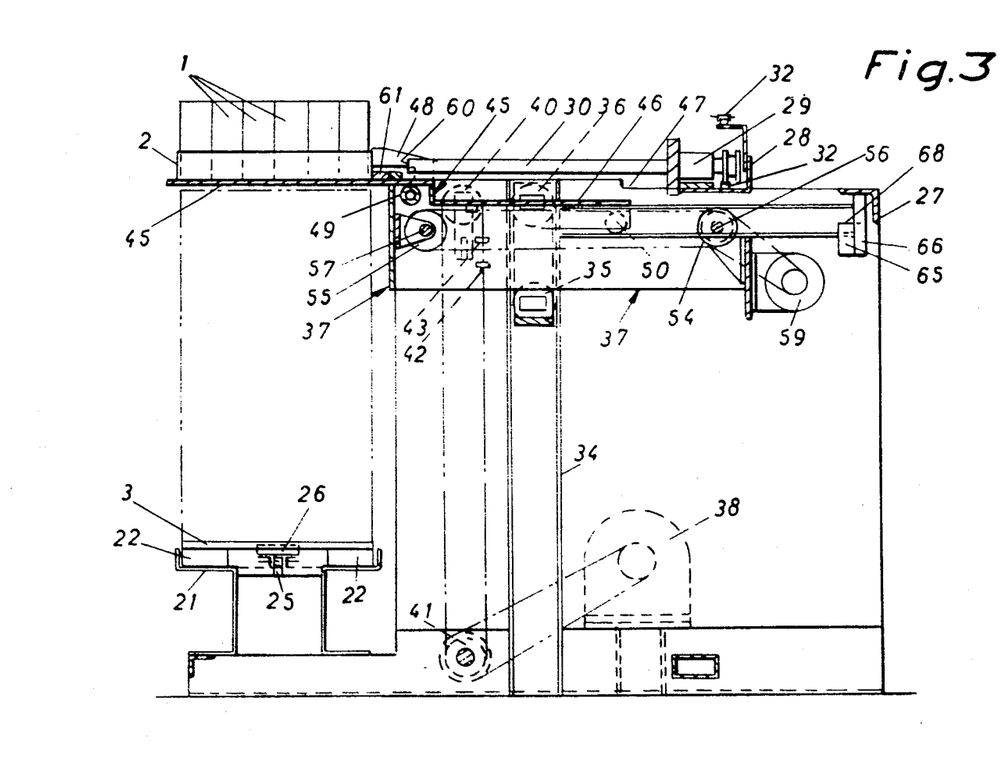
FIG. 3 is a section similar to FIG. 2 showing the loading plate having been moved to its forward position.

The loading machine operates in the following manner. Assuming that the stopper 11 is in the position shown in full lines in FIG. 1. When two trays 2 with milk cartons 1 supported thereon have been advanced on the conveyor 5 to the position shown in FIG. 1, an impulse is given to a valve, displacing the pusher means 12 to the right as seen in FIG. 1 bringing with it the trays 2 which are advanced onto the rollers 30 by the feeding conveyor 6. When the trays 2 abut against a stoplug 69, an impulse is given to the electric motor 59 displacing the loading plate 44 from the position shown in FIG. 2 to the position shown in FIG. 3, whereby the carrier means 40 moving together with the loading plate, displace the trays 2 along the rollers 30 and past the stripper edge 61 which has swung up to a horizontal position when influenced by the forward edge of the loading plate 44. An impulse is now automatically given to the electric motor 38, whereby the elevator cage 37 is lowered to its lower position with the loading plate 44 closely above the pallet 3 which has been displaced into loading position. When the loading plate 44 is thereafter retracted by the electric motor 59 to its inner position in the elevator cage 37, the two trays 2 supporting the milk cartons are stripped off the loading plate and thus deposited on the pallet 3. The electric motor 38 lifts the cage 37 back to its upper position (FIG. 2).

Figure 4:
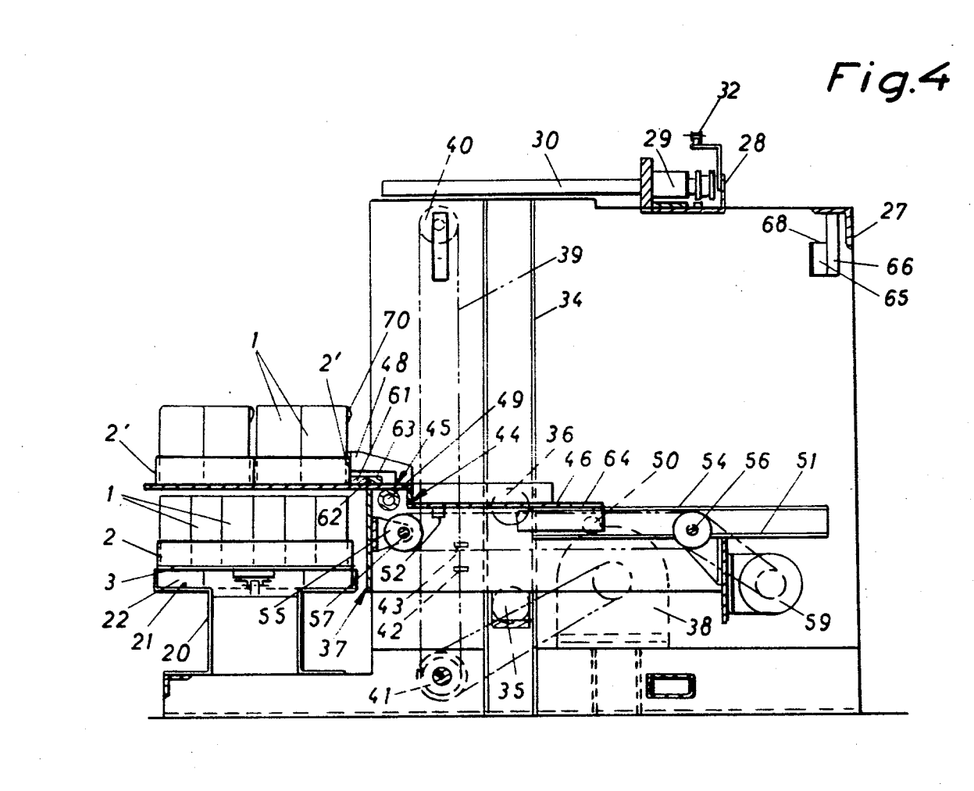
FIG. 4 is a section similar to FIG. 2 and shows the elevator cage incorporated in the machine in the lower cage position, the unloading position.

When the next tray 2' with milk cartons 1 thereon is advanced on the conveyor 5 and the stopper means 11 is in its position adjacent the edge 18 of the conveyor 6 (the position shown in dash-and-dot lines in FIG. 1), the trays will be forwarded so far that the front edge of this tray will reach longitudinal edge 18 of the conveyor 6. By means of the pusher 12 the tray 2' is transferred onto the conveyor 6 and when its front corner which slides along edge 18, abuts against the lug 19, the tray is turned through 90° and thus fed onto the rollers 30 such that it arrives thereon with its longitudinal edge first, and is then stopped by the abutment 69. The following tray 2' with milk cartons 1 thereon is displaced in the same way since the stopper means 11 is allowed to remain in its last-mentioned position. The carrier means 48 on the loading plate 44 consequently push the two trays 2', thus turned through 90° and carrying milk cartons 1, onto the loading plate 44 when the plate is being swung outwards on the elevator cage 37, whereupon the latter is lowered to the position shown in FIG. 4. When the loading plate 44 is again retracted, the trays 2' will be deposited on the layer of milk cartons 1 already placed on the pallet 3 and since the trays 2' have been turned through 90° relative to the trays 2, the mild cartons 1 on the trays 2 will be bound crosswise by the trays 2'. The elevator cage 37 returns to its upper position. The next pair of trays 2 are loaded in the same manner as the two first trays and the loading thus continues with alternatingly un-turned trays 2 and turned trays 2'.

Figure 5:
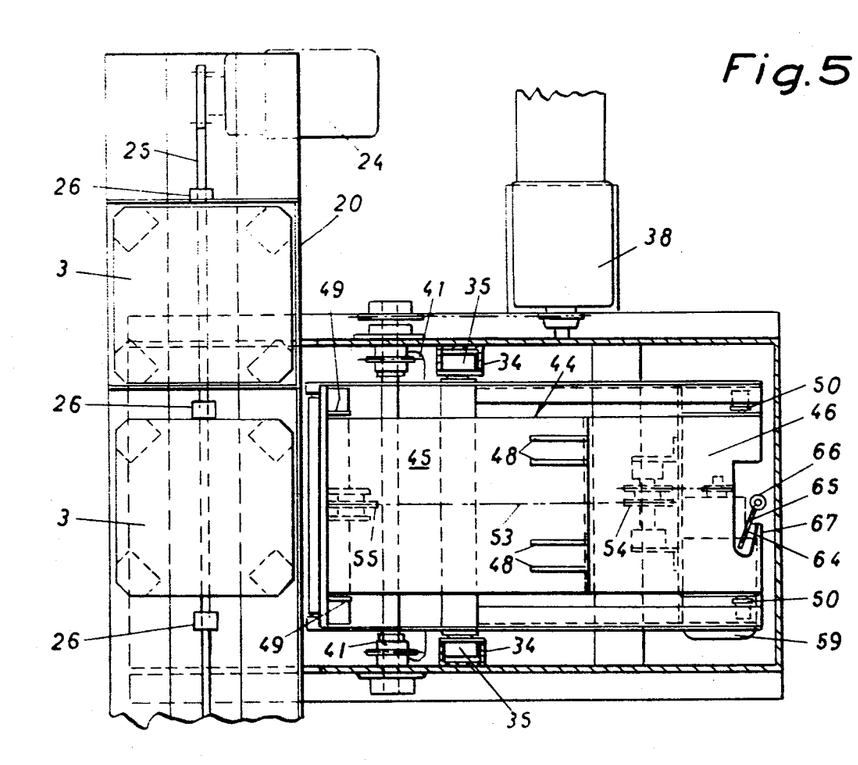
FIG. 5 is a horizontal section through the machine along line V—V in FIG. 2.

Every time the elevator cage 37 returns to its upper position, the operating arm is left uneffected since it extends freely into the opening 64. When, on the other hand, the uppermost layer of trays 2 has been deposited on the pallet 3 and the loading plate 44 returns to its retracted position, the tongue 67 abuts against the arm 65, whereby the shaft 66 thereof turns counter clock-wise as seen in FIG. 5. This starts the motor 24 such that the pallet 3 with its load thereon is moved out of the machine and an empty pallet 3 simultaneously placed in position for loading.

When the loading plate 44 is retracted in the elevator cage 37, the stripper edge 61 swings, do to its own weight to a vertical position and will thus, when the elevator cage 37 returns to its upper position, be positioned at a safe distance from the milk cartons 1 so as not to interfere with projecting flanges 70, carrying handles or the like with which the cartons may be provided.

The machine as shown and described is an example only and its various parts may be constructively changed in various ways within the scope of the appended claims. Other loading patterns than the one shown on the drawings are possible. For instance, the trays 2 may have an elongate shape such that one single row of milk cartons 1 will be placed on the tray, i.e., the tray has such a shape that the length of its longitudinal side corresponds to the length of the pallet side whereas the length of its short side is but a fourth of the pallet side. In this case four trays in a row must be turned through 90° and then be transferred all together in turned position by means of the loading plate 44 onto the pallet 3 or onto the layers of trays already deposited thereon, respectively. Instead of milk cartons 1 it is, of course, possible to load other objects of identical shape, such as tins or bottles supported on trays with aid of the machine. Also other articles can be handled by the machine and loaded thereby onto pallets without having to be supported on trays 2.

What I claim is:

1. An improved machine for loading objects in groups onto a pallet or the like in superposed layers, the machine including in combination a plurality of parallel rollers disposed in a horizontal plane with each of said rollers being spaced from adjacent rollers forming a space therebetween, feeder means for feeding said objects onto said rollers, a discharge end of said rollers, a pallet supply device for supplying pallets, one at a time, to a position adjacent said discharge end, an elevator cage adapted to be moved vertically step-by-step, elevator cage moving means for moving said elevator cage, a loading plate mounted upon said elevator cage, an inward position of said loading plate beneath said rollers, an outward position of said loading plate above said pallet supply device, loading plate moving means for shifting said loading plate horizontally between said inward and outward positions, carrier means mounted on said loading plate and extending upwardly through the spaces between said rollers in the inward position of said loading plate whereby upon shifting of said loading plate from said inward to said outward position said carrier means abuts said objects and pushes them off said rollers and onto said loading plate in the outward position thereof, and a stripper plate mounted upon said elevator cage and hinged at an edge situated close to said rollers at said discharge end whereby in its swung-down position said stripper plate will lie across the path of movement of the loading plate when the latter is being shifted from said inward to said outward position and will be swung upwards into its horizontal stripping position by said loading plate as it is shifted to said outward position and against which said objects abut upon said loading plate being shifted from said outward to said inward position whereby said objects are removed from said loading plate to a pallet in said pallet supply device by the action of gravity.

2. An improved machine as in claim 1 wherein the improvement comprises an opening in the rear end of the loading plate, the said opening being in the form of an inwardly directed tongue, an operating means being adapted to cooperate with said tongue such that said operating means, when contacted by said tongue, is brought to a position for opening or closing a circuit to a motor driving said device controlling said pallet supply device.

3. An improved machine as in claim 1 wherein each of said rollers is rotatably driven and said loading plate is provided with a portion which does not support any load and which extends at a lower level than does the remainder of the plate, whereby an area is formed for accommodation therein of the driving means for the rollers.

4. An improved machine as in claim 1 wherein turning means are operatively associated with said feeder means for turning selected ones of said objects through an angle in the horizontal plane.

5. An improved machine as in claim 4 wherein said feeder means includes a conveyor and said turning means includes a stop lug situated above one edge of said feeding conveyor whereby groups of objects abutting against said stop lug will be turned on said conveyor.

* * * * *

UNITED STATES PATENT OFFICE
CERTIFICATE OF CORRECTION 5019-22

Patent No. 3,648,857                       Dated March 14, 1972

Inventor(s) Halvor Grasvoll

It is certified that error appears in the above-identified patent and that said Letters Patent are hereby corrected as shown below:

Col. 1, line 22, after "characterized" insert--in--;

line 61, after "by" delete--the--first instance;

Col. 2, line 13, after "position," change "on" to--one--;

Col. 3, line 4, after "chain" insert--58 from an electric motor 59 having a gear drive--;

line 12, change "striper" to--stripper--; and

Col. 4, line 4, change "mild" to--milk--.

Signed and sealed this 15th day of August 1972.

(SEAL)
Attest:

EDWARD M. FLETCHER, JR.          ROBERT GOTTSCHALK
Attesting Officer                Commissioner of Patents